United States Patent
Maeno

(10) Patent No.: US 7,310,325 B2
(45) Date of Patent: Dec. 18, 2007

(54) METHOD OF CONSERVING POWER IN WIRELESS LOCAL AREA NETWORK

(75) Inventor: Kohta Maeno, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 233 days.

(21) Appl. No.: 11/142,279

(22) Filed: Jun. 2, 2005

(65) Prior Publication Data

US 2005/0282573 A1 Dec. 22, 2005

(30) Foreign Application Priority Data

Jun. 16, 2004 (JP) ............................. 2004-178749

(51) Int. Cl.
*H04Q 7/24* (2006.01)

(52) U.S. Cl. ...................... 370/338; 370/355; 455/574; 455/343.2

(58) Field of Classification Search ............... 370/335, 370/355, 338; 455/343.1, 574, 561, 343.2, 455/343.5

See application file for complete search history.

(56) References Cited

U.S. PATENT DOCUMENTS 6,377,790 B1 * 4/2002 Ishii ........................ 455/343.1
6,970,716 B2 * 11/2005 Rune et al. ............... 455/552.1
7,020,102 B2 * 3/2006 Tuomainen et al. ........ 370/311
2004/0198469 A1 * 10/2004 Kurokawa .................. 455/574

FOREIGN PATENT DOCUMENTS

JP         11-313370        11/1999
JP         2003-124940      4/2003

* cited by examiner

*Primary Examiner*—Sanh D. Phu
(74) *Attorney, Agent, or Firm*—Takeuchi & Kubotera, LLP

(57) ABSTRACT

A mobile terminal device searches a beacon signal sent from an access point through a wireless LAN, and obtains beacon frame information for certification and connection permission. The mobile terminal device then holds network information necessary for data communication with the access point, and measures a period of time between each time the data communication is performed. The mobile terminal device terminates electric power supplied to hardware for performing the data communication with the access point when the data communication is not performed within a predetermined period of time and network connection is terminated. The electric power is supplied to the hardware when it is necessary to send data to the access point through an input operation of the mobile terminal device while the electric power to the hardware is terminated. Accordingly, the mobile terminal device can be frequently disconnected from the network for a very short period of time.

4 Claims, 4 Drawing Sheets

METHOD OF CONSERVING POWER IN WIRELESS LOCAL AREA NETWORK

BACKGROUND OF THE INVENTION AND RELATED ART STATEMENT

The present invention relates to a method of conserving electric power in a wireless local area network (LAN). More specifically, the present invention relates to a technology for reducing power consumption of a mobile terminal device with a battery as a power source. Patent Reference 1; Japanese Patent Publication (Kokai) No. 11-313370

FIG. 2 shows a conventional mobile bucket communication system disclosed in Patent Reference 1. In the mobile bucket communication system, while a connection (SVC; Switching Virtual Circuit) is established between a mobile terminal device PS1 and a gateway GW, a timer disposed in the mobile terminal device PS1 as a timing device watches a period of time when data communication is not performed. When the data communication is not performed for a specific period of time, the mobile terminal device PS1 sends a sleep notice to the gateway GW. Accordingly, the connection between the devices is disconnected, and the mobile terminal device PS1 becomes a sleep state.

After the connection is disconnected, when it is necessary to send bucket data through the connection, the connection is re-connected according to routing information stored when the connection is originally established. Accordingly, when the data communication is not performed for a specific period of time, the mobile terminal device PS1 becomes the sleep state, thereby reducing power consumption.

In Patent Reference 1, no specific numerical example has been disclosed regarding how long the timer watches for switching the mobile terminal device PS1 to the sleep state. Every time the mobile terminal device PS1 is switched to the sleep state, it is necessary to disconnect and reset the connection. Accordingly, it is difficult to set the timer to watch for a long period of time considering transfer efficiency and an influence of a load on the gateway GW. As a result, it is difficult to reduce power consumption to a large extent through switching the mobile terminal device PS1 to the sleep state.

In view of the problems described above, an object of the present invention is to provide a method of conserving electric power in a wireless LAN to a large extent.

Further, in the conventional technology, when power is conserved, a liquid crystal display becomes dim or a response is slowed, thereby causing inconvenience to a user using a browser. Accordingly, another object of the present invention is to provide a method of conserving power of a mobile terminal device upon communication without causing such inconvenience.

Further objects and advantages of the invention will be apparent from the following description of the invention.

SUMMARY OF THE INVENTION

In order to attain the objects described above, according to the present invention, a method of conserving electric power in a wireless LAN includes a search step of searching a beacon signal periodically sent from an access point with a mobile terminal device through the wireless LAN to obtain beacon frame information sent from a desired access point; a certification step of sending a certification request from the mobile terminal device to the desired access point to obtain certification from the desired access point; a connection step of sending a connection request from the mobile terminal device to the desired access point to obtain connection permission from the desired access point; an information holding step of holding network information in the mobile terminal device necessary for data communication with the desired access point; a power termination step of terminating electric power supplied to hardware for performing the data communication with the desired access point when the data communication is not performed within a predetermined period of time and network connection is terminated while the mobile terminal device measures a period of time between each time the data communication is performed; a power supply step of supplying the electric power to the hardware when it is necessary to send data from the mobile terminal device to the desired access point through an input operation of the mobile terminal device while the electric power to the hardware is terminated; and a communication resuming step of resuming the data communication with the desired access point according to the network information after the electric power is supplied again to the hardware.

In the invention, the method includes the search step of searching the beacon signal sent from the desired access point; the certification step of the desired access point; and the information holding step of holding the network information obtained in the connection process and necessary for the data communication. Accordingly, when the data communication is not performed for the predetermined period of time, it is possible to perform the communication resuming step with the network information even if the electric power supplied to the hardware for performing the data communication is terminated. Therefore, it is possible to conserve the electric power of the mobile terminal device in the wireless LAN.

In a conventional technology, when electric power is conserved, a liquid crystal display becomes dim or a response is slowed, thereby causing inconvenience to a user using a browser. In the present invention, the mobile terminal device is frequently disconnected from the network for a very short period of time. Accordingly, a user does not notice the disconnection, thereby eliminating the inconvenience associated with the power conservation.

DETAILED DESCRIPTION OF PREFERRED EMBODIMENTS

Hereunder, embodiments of the present invention will be explained with reference to the accompanying drawings. The drawings are schematically shown for explanation of the present invention, and the present invention is not limited thereto.

Before being certified, a mobile terminal device searches a beacon signal sent from an access point through a wireless LAN, and obtains beacon frame information sent from a desired access point. The mobile terminal device obtains certification and connection permission from the desired access point according to the beacon frame information. The mobile terminal device then holds network information necessary for data communication with the desired access point.

After obtaining the connection permission, the mobile terminal device measures a period of time between each time the data communication is performed. The mobile terminal device terminates electric power supplied to hardware for performing the data communication with the desired access point when the data communication is not performed within a predetermined period of time. The electric power is supplied to the hardware when it is necessary to send data to the desired access point through an input operation of the mobile terminal device while the electric power to the hardware is terminated. Also, the data communication with the desired access point is performed according to the network information.

Figure 1:
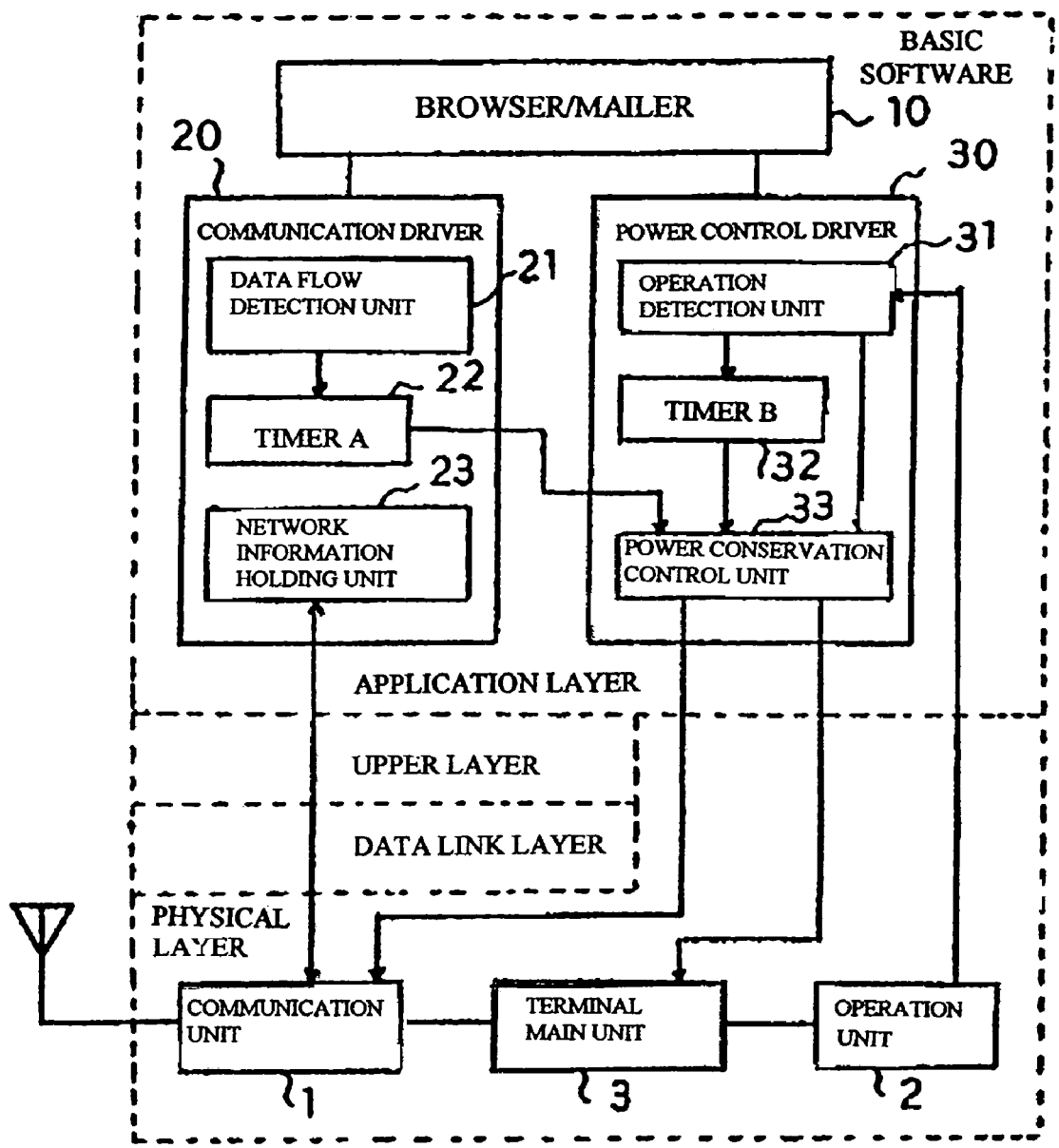
FIG. 1 is a schematic block diagram showing a mobile terminal device according to an embodiment of the present invention.
Figure 2:
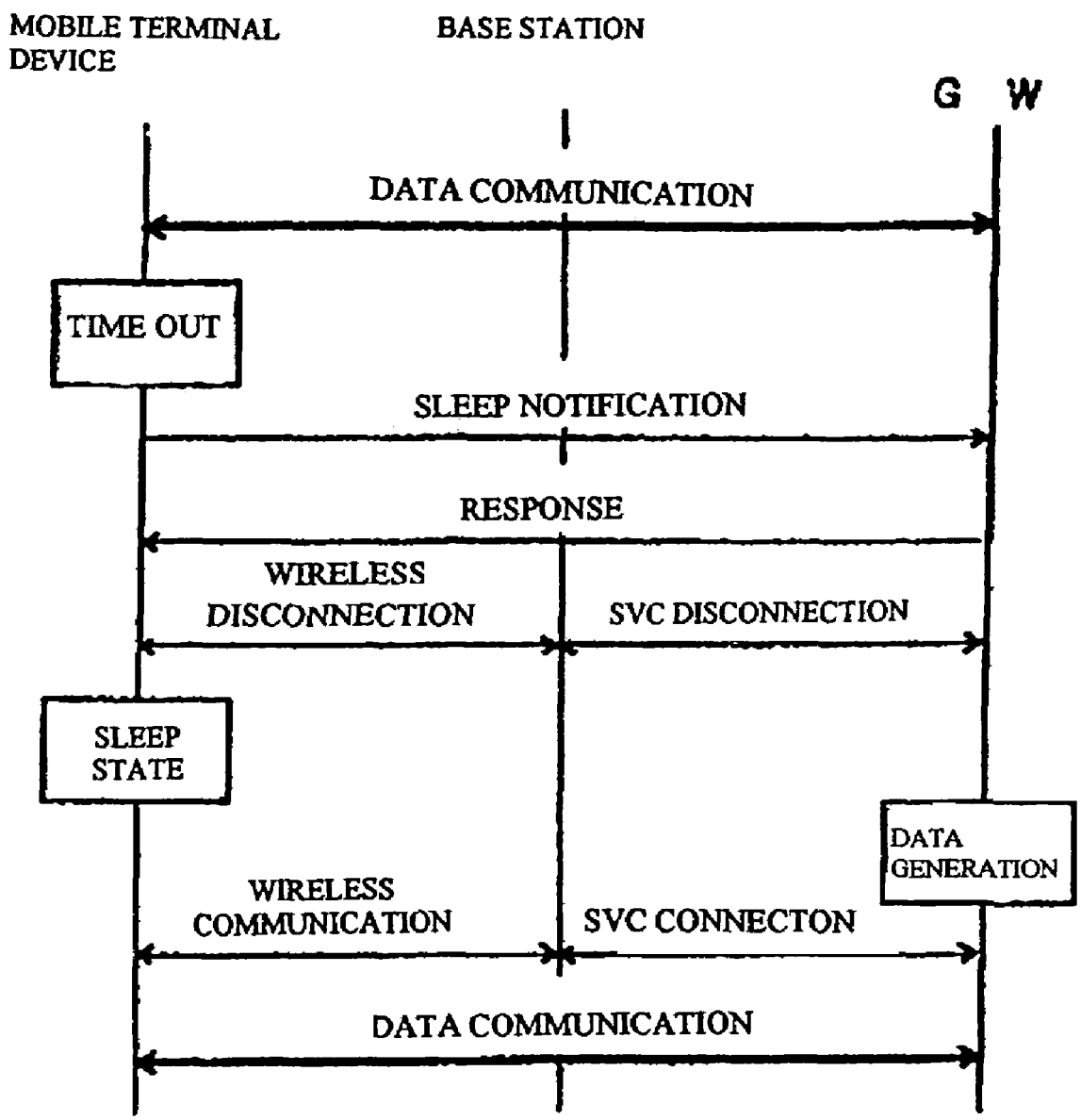
FIG. 2 is a schematic block diagram showing an operation sequence of a conventional mobile bucket communication system.

FIG. 1 is a schematic block diagram showing a mobile terminal device according to an embodiment of the present invention. The block diagram is shown according to a network protocol layer.

The mobile terminal device is formed of a physical layer as hardware; a data link layer including sub-layers of MAC (Media Access Control) and LLC (Logical Link Control); an upper layer such as TCP/IP (Transmission Control Protocol/Internet Protocol); an application layer having an application program.

The physical layer is formed of a communication unit 1 including an antenna; an operation unit 2 including a mouse and a keyboard; a terminal main unit 3 including a CPU (Central Processing Unit), a memory and a liquid crystal display; and a battery (not shown). The data link layer, the upper layer, and the application layer are formed of software to be operated under basic software suitable for a mobile device such as ITRON (Industrial The Real-time Operation system Nucleus). In the specification, the basic software is not explained.

The application layer includes an application program 10 such as a browser and a mailer; a communication driver 20 for controlling an operation of hardware; and a power control driver 30. The browser is a program for browsing information on the Internet, and the mailer is program for sending and receiving an email through the Internet.

The communication driver 20 controls the communication unit 1 according to a communication command from the application program 10. In addition to a normal communication function, the communication driver 20 is provided with a data flow detection unit 21, a timer A 22, and a network information holding unit 23 as functions for conserving power.

The data flow detection unit 21 watches data communication of the application program 10 such as a browser. When the data communication is complete, the data flow detection unit 21 starts the timer A 22. When the data communication is resumed, the data flow detection unit 21 resets the timer A 22. Among received data, data sent to other terminal devices are ignored.

When the timer A 22 is started and is not reset within a predetermined period of time, the timer A 22 sends an interruption signal to the power control driver 30 to stop power to the communication unit 1. The network information holding unit 23 holds information regarding a network to which the mobile terminal device is connected. The network information holding unit 23 holds the information even after power is off.

The information held in the network information holding unit 23 includes SSID (Service Set Identification), BSSID (Basic Service Set Identifier), a channel number used by the network, and beacon frame information. The SSID is an identification name for specifying a specific network in the wireless LAN, and may be simply called a network name. Only parties with a matched SSID can communicate. The BSSID is also an identification name for specifying a specific network in the wireless LAN. Normally, a MAC address of an access point to be a center of the network is used as the BSSID. The beacon frame is information sent from an access point at a constant interval (for example, 100 ms) through an available channel. The beacon frame information includes SSID, a beacon interval, performance information, a communication rate, and a parameter set of the physical layer.

The power control driver 30 watches an operational state of the mobile terminal device, and supplies power to the communication unit 1 and the terminal main unit 3 according to the operational state. The power control driver 30 is provided with an operation detection unit 31, a timer B 32, and a power conservation control unit 33 as functions for conserving power.

The operation detection unit 31 watches an input state of the operation unit 2 such as a mouse and a keyboard. When the input is not performed, the operation detection unit 31 starts the timer B 32. When the input is started, the operation detection unit 31 resets the timer B 32. During the power save mode, when the input state of the operation unit 2 is detected, the operation detection unit 31 controls the power conservation control unit 33 to return to the normal mode.

When the timer B 32 is started and is not reset within a predetermined period of time, the timer B 32 sends an interruption signal to conserve power of the terminal main unit 3. The power conservation control unit 33 controls the communication unit 1 and the terminal main unit 3 according to the interruption signals from the timer A 22 and the timer B 32.

Figure 3:
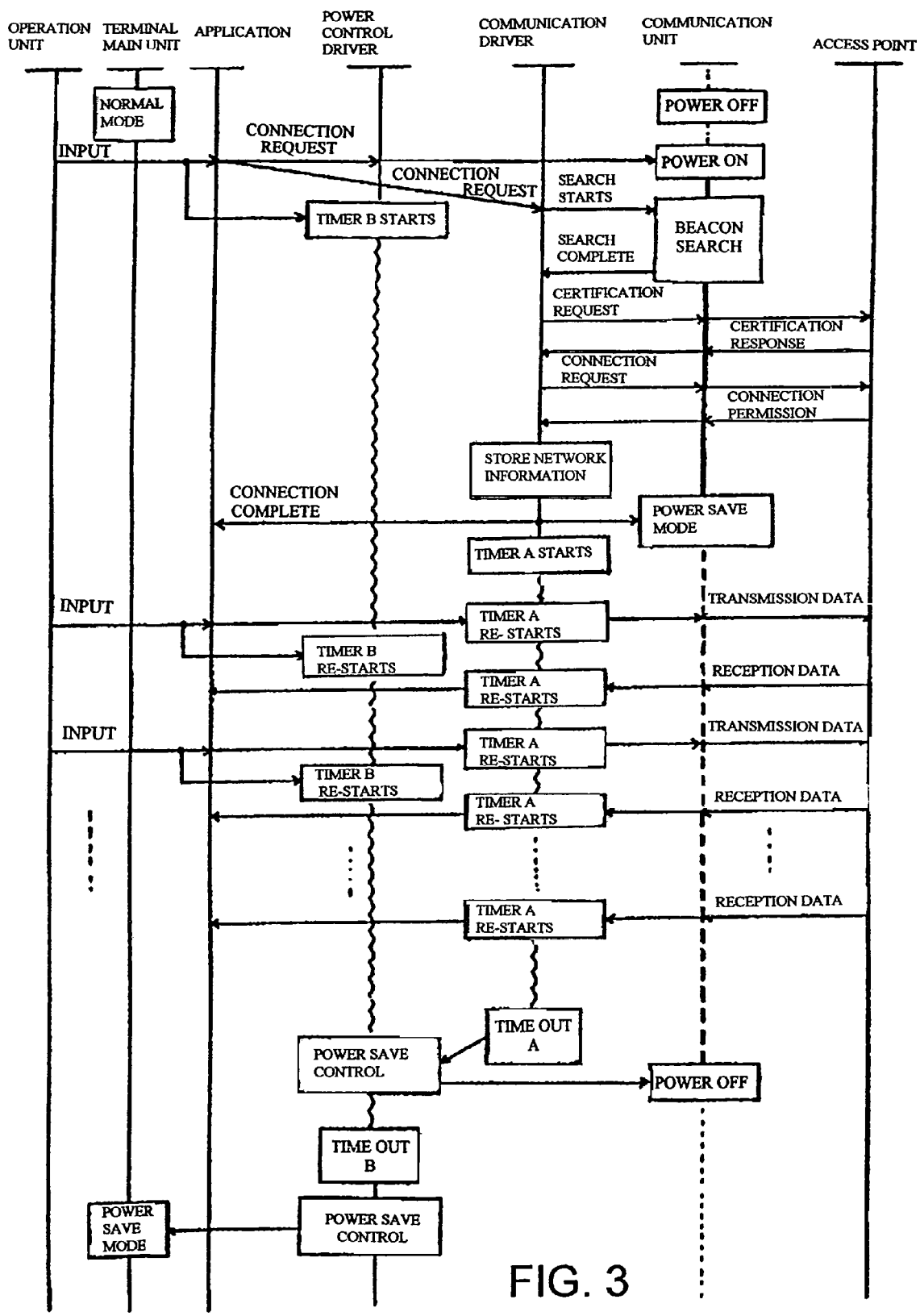
FIG. 3 is a schematic block diagram showing an operation sequence (No. 1) of the mobile terminal device shown in FIG. 1.
Figure 4:
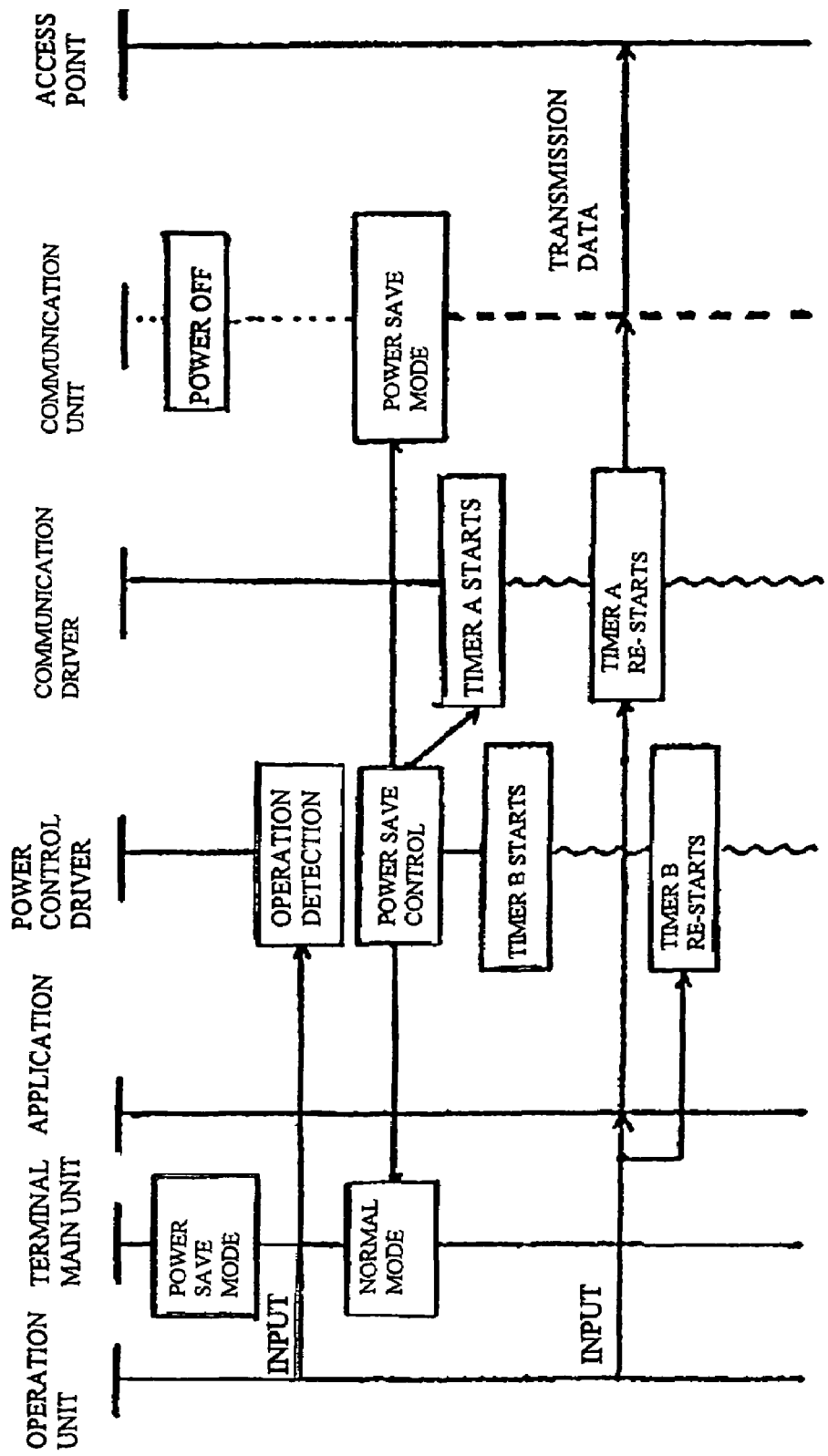
FIG. 4 is a schematic block diagram showing an operation sequence (No. 2) of the mobile terminal device shown in FIG. 1.

FIG. 3 and FIG. 4 are schematic block diagrams showing operation sequences (No. 1) and (No. 2) of the mobile terminal device shown in FIG. 1. With reference to FIG. 3 and FIG. 4, a method of conserving power in the wireless LAN using the mobile terminal device shown in FIG. 1 will be explained.

Sequence No. 1; Start Up to Power Save Mode

As shown in FIG. 3, when the mobile terminal device is turned on and the terminal main unit 3 becomes the normal mode, since the communication between the mobile terminal device and the access point is not established, power of the communication unit 1 is turned off for conserving power.

When the browser, for example, as the application program 10 is launched and the demand for connecting the Internet is input through the operation unit 2, the operation detection unit 31 of the power control driver 30 detects the input operation. Accordingly, the timer B 32 is started, and time watch for a predetermined period of time such as 3 to 10 minutes starts.

At the same time, the application program 10 sends the connection demand to the power control driver 30, so that the power conservation control unit 33 turns on the communication unit 1. Further, the application program 10 sends the connection demand to the communication driver 20, so that the communication driver 20 and the communication unit 1 start the beacon search. The beacon search is an operation of searching for a beacon signal periodically (for example, every 10 ms) sent from an access point to establish a wireless communication channel to the access point. Each access point has a beacon signal with a different channel number. Accordingly, it is necessary to search for the beacon signal of a desired access point while scanning the channel.

After the beacon search is complete, an operation of connection and certification is performed between the communication driver 20 and the access point. In the operation, first, the communication driver 20 requests the certification according to the beacon frame information obtained from the desired access point through the beacon search, and the communication driver 20 receives the certification response from the access point. Then, the communication driver 20 requests the communication according to the certification response, and receives the connection permission from the access point. Accordingly, the wireless communication channel is established between the mobile terminal device and the access point.

The network information holding unit 23 stores the setting information. The communication driver 20 notifies the application program 10 of the completion of the connection, and the timer A 22 is started to start the time watch for a predetermined period of time such as 30 to 60 seconds. The communication unit 1 becomes the power save mode.

The power save mode of the communication unit 1 is an operation mode for conserving electric power in the wireless LAN according to, for example, ANSI/IEEE std 802.11 (1999). In the power save mode, the communication unit 1 is operated at timing of the beacon signal periodically sent from the access point, and stops at other timing.

In this state, the timer B 32 is re-started every time the input is sent from the operation unit 2. Accordingly, the watch time is re-set, and the time watch is started again. When the input from the operation unit 2 is transmission data to be sent to the access point, the communication unit 1 sends the transmission data under the power save mode, and the timer A 22 in the communication driver 20 is started again. When data to be sent to the mobile terminal device is received from the access point, the received data is transferred to the application program 10, and the timer A 22 in the communication driver 20 is started again. Accordingly, when the communication between the mobile terminal device and the access point is performed frequently, the timer A 22 and the timer B 32 are started each time, and no time out occurs.

When the communication stops, the timer A 22 becomes time out, and the interruption signal to the power control driver 30 is generated. Accordingly, the power control driver 30 controls the communication unit 1 to stop power, so that the communication unit 1 completely becomes an off state. As a result, while the mobile terminal device cannot receive the beacon signal frequently sent from the access point, all the communication is complete, thereby posing no problem. Further, the access point does not request the response to the beacon signal, thereby posing no problem. In this state, a process other than the communication such as displaying the browser and a scroll continues to be performed.

After a predetermined time since when the communication stops, the timer B 32 becomes time out, and the interruption signal to the power conservation control unit 33 is generated. Accordingly, the power conservation control unit 33 controls the terminal main unit 3 to become the power save mode. As a result, the mobile terminal device becomes the power save mode, in which all the operations are stopped except holding the operational state necessary for start up and a minimum function for receiving an input fro the operation unit 2.

Sequence No. 2; Power Save Mode to Re-Start

As shown in FIG. 4, when the mobile terminal device is in the power save mode, the communication unit 1 is turned off. When an input operation is received from the operation unit 2, the operation detection unit 31 of the power control driver 30 detects the input operation. Accordingly, the power conservation control unit 33 returns the terminal main unit 3 to the normal mode, and the communication unit 1 is turned on and returns to the power save mode.

When only the communication unit 1 is turned on and the terminal main unit 3 does not become the power save mode, that is, the input operation from the operation unit 2 is performed in the normal mode, the power conservation control unit 33 simply turns on the communication unit 1, thereby retuning the communication unit 1 to the power save mode.

The timer A 22 and the timer B 32 are activated to start the time watch, respectively. When the input from the operation unit 2 is transmission data to be sent to the access point, the communication unit 1 sends the transmission data under the power save mode according to the set information of the wireless connection with the access point held in the network information holding unit 23. Then, the mobile terminal device moves to the operation of the communication described in Sequence (1).

As described above, in the present invention, the mobile terminal device has the network information holding unit 23 for holding the network information such as SSID, BSSID, the channel number, and the beacon frame information obtained when the wireless connection to the access point is established even in the power save mode. Accordingly, it is not necessary to establish the wireless connection again when the communication unit 1 is re-started, even if the communication unit 1 is turned off when the communication with the access point is terminated. Therefore, it is possible to make the communication unit 1 in the off state completely, thereby effectively conserving power.

When the network information is not used, it normally takes more than one second (up to two seconds) to resume the communication. When the network information is used, it normally takes no more than 100 ms to resume the communication. Accordingly, in the invention, the disconnection and re-connection to the network are performed frequently, thereby greatly conserving power.

In the conventional technology described above, a user may suffer inconvenience when a main device is in a power save mode. In the invention, the disconnection and re-connection to the network are performed frequently even when the liquid crystal display and the browser are operated normally. The disconnection and re-connection to the network are performed in a very short period of time, so that a user does not notice, thereby eliminating the inconvenience during the power save mode.

The present invention is not limited to the embodiments described above, and may be modified as follows.

In the embodiments, the configuration of software such as the communication driver 20 and the power control driver 30 is just an example, and may be formed arbitrarily as far as having equivalent functions. For example, the network information holding unit 23 may be combined in the data link layer. The timers A and B may be formed of software.

In the embodiments, the set time of the timers A and B is just an example, and may be set arbitrarily. In this case, it is necessary to set the set time of the timer A for turning off the communication unit shorter than that of the timer B for returning the terminal main unit 3 to the power save mode.

In the embodiments, when the timer A becomes time out, the communication unit 1 is immediately turned off. Alternatively, it is possible to turn off the communication unit 1 after the certification with the access point is canceled and the connection demand is stopped. In this case, the network information obtained when the wireless connection is established for the first time is held in the network information holding unit 23 without deleting. Accordingly, it is not necessary to search for the beacon signal when the communication unit 1 is turned on and the certification request is performed, thereby making it possible to complete the connection in a short period of time.

The disclosure of Japanese Patent Application No. 2004-178749, filed on Jun. 16, 2004, is incorporated in the application.

While the invention has been explained with reference to the specific embodiments of the invention, the explanation is illustrative and the invention is limited only by the appended claims.

What is claimed is:

1. A method of conserving electric power in a wireless local area network (LAN), comprising:
   a search step of searching a beacon signal periodically sent from an access point through the wireless LAN with a mobile terminal device to obtain beacon frame information sent from the access point;
   a certification step of sending a certification request from the mobile terminal device to the access point to obtain certification from the access point;
   a connection step of sending a connection request from the mobile terminal device to the access point to obtain connection permission from the access point;
   an information holding step of holding network information in the mobile terminal device necessary for data communication with the access point;
   a power termination step of terminating electric power supplied to hardware of the mobile terminal device for performing the data communication with the access point when the data communication is not performed within a predetermined period of time and network connection is terminated while the mobile terminal device measures a period of time between each time the data communication is performed;
   a power supply step of supplying the electric power to the hardware when it is necessary to send data from the mobile terminal device to the access point through an input operation of the mobile terminal device while the electric power to the hardware is terminated; and
   a communication resuming step of resuming the data communication with the access point according to the network information after the electric power is supplied again to the hardware.

2. A method of conserving electric power in a wireless local area network (LAN), comprising:
   a search step of searching a beacon signal periodically sent from an access point through the wireless LAN with a mobile terminal device to obtain beacon frame information sent from an access point;
   a certification step of sending a certification request from the mobile terminal device to the access point to obtain certification from the access point;
   a connection step of sending a connection request from the mobile terminal device to the access point to obtain connection permission from the access point;
   an information holding step of holding network information in the mobile terminal device necessary for data communication with the access point;
   a canceling certification step of canceling the certification when the data communication is not performed, said canceling certification step being performed by the access point, within a predetermined period of time while the mobile terminal device measures a period of time between each time the data communication is performed;
   a power termination step of terminating electric power supplied to hardware of the mobile terminal device for performing the data communication with the access point after the certification is canceled;
   a power supply step of supplying the electric power to the hardware when it is necessary to send data from the mobile terminal device to the access point through an input operation of the mobile terminal device while the electric power to the hardware is terminated;
   a re-certification step of obtaining the certification from the access point again according to the network information after the electric power is supplied again to the hardware; and
   a communication resuming step of sending the data to the access point after the certification is obtained again.

3. A method of conserving electric power in a wireless local area network (LAN), comprising:
   connecting a mobile terminal device to the wireless LAN, said mobile terminal device including a communication driver and a power control driver both operating under an application program;
   certifying the mobile terminal device,
   monitoring data communication with a data flow detection unit in media access control (MAC) protocol software, said data communication being performed by the application program through the communication driver;
   storing information related to the wireless network with the mobile terminal device when a data frame is not detected within a predetermined period of time through measurement by a timer;
   canceling the certification of the mobile terminal device;
   disconnecting the mobile terminal device from the wireless LAN; and
   controlling a communication unit of the mobile terminal device to become a low electric power state through the power control driver.

4. A method of conserving electric power according to claim 3; further comprising:
   resuming the data communication by the application program through the communication driver when the communication unit becomes the low electric power state through the steps according to claim 3,
   controlling the communication unit to cancel the lower electric power state through the power control driver, and
   connecting and certifying the mobile terminal device to the wireless LAN according to the information related to the wireless network.

* * * * *